(12) United States Patent
Solntseva et al.

(10) Patent No.: US 6,558,547 B1
(45) Date of Patent: May 6, 2003

(54) MATERIAL FOR INTRODUCING PHYSIOLOGICALLY ESSENTIAL INORGANIC ELEMENTS INTO DRINKABLE WATER

(75) Inventors: Dzhulietta Petrovna Solntseva, Moscow (RU); Mikhail Stanislavovich Krasnov, Moscow (RU); Mikhail Sergeevich Amiragov, Moscow (RU); Leonid Sergeevich Bobe, Moscow (RU)

(73) Assignee: Otkrytoe Aktsionernoe Obschestvo "Nauchno-Issledovatelsky Institut Plasticheskikh Mass Im. G. S. Petrova", Moscow (RU)

( * ) Notice: Subject to any disclaimer, the term of this patent is extended or adjusted under 35 U.S.C. 154(b) by 0 days.

(21) Appl. No.: 09/673,578
(22) PCT Filed: Apr. 21, 1999
(86) PCT No.: PCT/RU99/00124
§ 371 (c)(1),
(2), (4) Date: Oct. 18, 2000
(87) PCT Pub. No.: WO99/55626
PCT Pub. Date: Nov. 4, 1999

(30) Foreign Application Priority Data

Apr. 27, 1998 (RU) .......................................... 98108073

(51) Int. Cl.⁷ .............................. B01D 39/00; C02F 5/00
(52) U.S. Cl. ................... 210/502.1; 210/503; 502/401; 502/406; 252/179

(58) Field of Search ................................. 210/660, 669, 210/681, 688, 502.1, 503, 504, 900; 502/401, 406, 423; 252/179

(56) References Cited

U.S. PATENT DOCUMENTS 5,034,138 A    7/1991  Hatanaka et al. ............. 210/749
6,126,805 A *  10/2000 Batchelder et al. .......... 204/630
6,174,437 B1 * 1/2001  Haney ...................... 210/257.2

FOREIGN PATENT DOCUMENTS

| EP | 0202653 | 11/1986 |
|---|---|---|
| FR | 2687993 | 9/1993 |
| RU | 2056358 | 3/1996 |
| RU | 2092451 | 10/1997 |
| RU | 2096341 | 11/1997 |
| RU | 2123978 | 12/1998 |
| SU | 1608138 | 11/1990 |

* cited by examiner

Primary Examiner—John Kim
(74) Attorney, Agent, or Firm—Ladas & Parry

(57) ABSTRACT

A material for introducing inorganic elements into water, the material including a carrier and a plurality of inorganic compounds that are sparingly soluble in water, wherein the carrier is an organic ion-exchanger having a porous structure in the air-dry state. The organic ion-exchanger reacts with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight.

12 Claims, No Drawings

MATERIAL FOR INTRODUCING PHYSIOLOGICALLY ESSENTIAL INORGANIC ELEMENTS INTO DRINKABLE WATER

TECHNICAL FIELD

The present invention relates to the conditioning of drinking water and more particularly to materials for introducing physiologically essential macro- and microelements into drinking water.

BACKGROUND ART

Known in the art is a material for conditioning drinking water, which material comprises dolomite-containing rock, containing, in weight percent: calcium, 20; magnesium, 11; iron, 0.002; copper, 0.01; cobalt, 0.001; nickel, 0.002; zinc, 0.01; chromium, 0.002; vanadium, 0.001. As water is passed through 1–5 mm granules of this mineral, ions of macroelements (calcium, magnesium) and of microelements (iron, copper, zinc), physiologically essential for human life, are introduced into the water (RF Patent. No. 2056358, IPC C02F 1/18, publ. 20.03.96).

Such material is disadvantageous in that other microelements cannot be introduced into it. The rate of passing water through a filling of such material is not high (1–2 l/h), because the physiologically essential elements are released only from the surface of the inorganic material.

A composition is known in the art for fluorinating (conditioning) drinking water, which composition comprises activated carbon and a material consisting of a cellulose ester (preferably cellulose acetate) and an inorganic compound containing fluorine ions (preferably calcium fluoride which is a poorly soluble compound). The granulometric composition of the material is 0.3–1.5 mm. The ratio of the components in the material, in weight percent, is 5–83:17–95 (RF Patent No. 2092451, IPC C02F 1/68, publ. 10.10.97). Such material makes it possible to saturate water with fluorine ions in an amount of 0.5–1.5 mg/l with the specific rate of water passage through the material of 0.5–5 $min^{-1}$.

This material is disadvantageous in that it is used only for introducing fluorine ions into the drinking wager. Weakly pronounced ion-exchange properties of the granules of the composition material rule out its simultaneous use for active removal of such a harmful admixture as heavy metal ions. Besides, the process of preparing this material is complicated, particularly because of using an inflammable liquid-acetone.

A material is also known for introducing physiologically essential ions into demineralized water, which material consists of granules of activated carbon, on the surface of whose pores poorly soluble inorganic compounds are present, which contain in their composition calcium and magnesium ions, releasable into the water. Depositing said inorganic poorly soluble compounds in the pores of activated carbon is accomplished by subjecting activated carbon to successive treatments with solutions of readily soluble substances which enter into exchange reactions resulting in precipitation of one of the reaction products. The activated carbon treated with each of the solutions has to be dried at a temperature of 150–200° C. (Inventor's Certificate of the USSR No. 1608138, IPC C02F 1/68, publ. 23.11.90).

This known material allows maintaining the concentration of calcium and magnesium ions in filtered water on the physiologically required level when the amount of the passed water is 30 l, the weight of the filling is 100 g and the rate of flow is 50 ml/min. The specific rate of filtration is 0.5 $min^{-1}$. Owing to its porous structure the material sorbs organic admixtures well enough and is also capable of retaining heavy metal ions by way of physical sorption. With the use of this material there is no steeping effect during breaks in operation.

The main disadvantage of such material is that it can be used only for introducing microelements such as magnesium, calcium, potassium. Other disadvantages of such material are: complexity of the process for preparing thereof, non-productive consumption of the reagents, as well as the absence of chemical sorption of heavy metal ions. The rate of water filtration through such material is not high.

The technical object of the present invention is therefore to provide a material which will ensure introducing into demineralized or drinking water physiologically essential micro- and macroelements with a stable release thereof into the water, simultaneous sorption of the admixtures of heavy metal ions and organic compounds from the water, and an increase in the rate of water filtration.

DISCLOSURE OF THE INVENTION

A material for introducing physiologically essential additives into drinking or demineralized water comprises an organic ion-exchanger having a porous structure in the air-dry state and inorganic poorly soluble compounds in the pores and on the surface thereof. The content of poorly soluble compounds in the material is 10–65 percent by weight.

Organic macrodorous or macromolecular net-work strongly and weakly acidic cation-exchangers with a polystyrene, polyacrylic and polymethacrylic matrix, as well as organic macroporous or macromolecular network high- and low-basic anion-exchangers with a polystyrene and polyacrylic matrix, or other agents similar in their structure and properties, having a total volume of pores of 0.1–1.0 $cm^3/g$ and 0.3–1.5 mm granules, are used as organic ion-exchangers having a porous structure in the air-dry state.

As inorganic poorly soluble compounds (PSC) the material comprises inorganic salts, oxides, hydroxides whose solubility is lower than 8 g/l and which have in their composition such elements essential for human life as Ca, Mg, F, Se, Zn, Cu, Fe, Mn, Cr, and others. The PSC comprising physiologically essential elements are formed as a result of exchange and redox reactions.

A process for the preparation of the material consists in successive treatment of an organic ion--exchanger with inorganic ionic compounds. The inorganic ion exchanger is treated first with an inorganic compound having a solubility higher than 8 g/l, for instance, with $CaCl_2$, $MgSO_4$, $NaF$, $Na_2SeO_3$, $ZnSO_4$, $CuSO_4$, $FeSO_4$, $MnSO_4$, $KMnO_4$, $Cr_2(SO_4)_3$, $Na_2SnO_3$, HCl, NaOH, KOH, $K_2CO_3$, HClO, one of the ions of the compounid passing to the ion-exchanger as a counterion. Then the ion-exchanger is treated with a second inorganic compound having a solubility higher than 8 g/l, one of whose ions reacts with the counterion of the ion-exchanger and forms an inorganic compound with a solubility a slower than 8 g/l (a poorly soluble compound) in the pores and on the surface of the ion-exchanger. Compounds presented hereinabove can be used as said second inorganic compound. In some Examples, for attaining the regularity and required level of the release of ions into the water, these operations are repeated 2–5 times, the PSC content in the material amounting to 10–65 percent by weight.

EXEMPLARY EMBODIMENTS OF THE INVENTION

EXAMPLE 1

Anion-exchanger AV-17-10P is treated with a $NaSO_4$ solution till 70–100% conversion thereof into sulfate form. Then the anion-exchanger is treated with a 5% solution of $CaCl_2$ under static conditions and with the solid-to-liquid (s/l) ratio==1:2. After contacting for 3 hours, the solution is decanted, the anion-exchanger is washed with distilled water. The operations are repeated 2 times. The material contains in its pores the poorly soluble compound (PSC) $CaSO_4$ in an amount of 65 percent by weight. The PSC content in the material is determined from the difference in the concentrations of calcium ions in the starting solution and equilibrium solutions.

The resultant material in an amount of 10 $cm^3$ is placed into a column with an inner diameter of 11 mm, and low-mineralized water is passed through the material (the total hardness (TH) being 0.5 mg-equiv/l). The content of calcium ions in the water is determined at the column outlet after passing 1, 10, 20 and 30 liters of water. When passing the water, the specific output is 3.0 $min^{-1}$. After the passage of 10 and 20 liters of water, a sample is taken, the flow is cut off for 24 hours, and after this interval a sample is taken again. The content of calcium ions is determined at the column outlet. The components of the material and the parameters of the process for preparing the material are presented in Table 1. The results of analyses and the physiological norms (PN) of th content of ions in the water are presented in Table 2.

EXAMPLE 2

Calion-exchanger KU-23 is treated with a $CaCl_2$ solution till 80–100% conversion thereof into calcium form. Then the anion-exchanger is treated with a 3% solution of NaF under static conditions with the s/l ratio=1:3. After contacting for 2 hours, the solution is decanted, he anion-exchanger is washed with distilled water. The material contains PSC $CaF_2$ in the amount of 16 percent by weight. The PSC content in the material is determined from the difference in the concentrations of fluorine ions in the starting and equilibrium solutions. The subsequent procedure is as described in Example 1, except that the material is taken in the amount of 3 $cm^3$, mineralized water with the TH of 3 mg-equiv./l is passed through the column, and the content of fluorine ions is determined in the filtrate.

EXAMPLE 3

Cation-exchanger S-106 (PUROLITE) is treated with a $CuSO_4$ solution till 60–90% conversion thereof into copper form. Then the cation-exchanger is treated with a 10% solution of NaOH under dynamic conditions in a column with the consumption of 3 volumes of the reagent per volume of the cation-exchanger. After contacting, the cation-exchanger is washed with distilled water. The operations are repeated 3 times. The material contains PSC $Cu(OH)_2$ in the amount of 58 percent by weight. For determining the PSC content in the material, the precipitate is dissolved, and the content of copper(II) ions in it is determined. The subsequent procedure is as in Example 1, except that mineralized water with the TH of 3 mg-equiv./l is passed through the column, and the content of copper ions is determined in the filtrate.

EXAMPLE 4

Anion-exchanger A-835 (PUROLITE) is treated with a $Na_2SeO_3$ solution till complete conversion thereof into selenite form. Then the anion-exchanger is treated with a 2% solution of $AgNO_3$ under static conditions with the s/l ratio=1:10. After contacting for 6 hours the solution is decanted, and the material is washed with distilled water. The material contains PSC $AgSeO_3$ in the amount of 10 percent by weight. For determining the PSC content in the material, the precipitate is dissolved, and the content of silver and the selenite ion in it is determined spectrophotmetrically, using 3,3'-diaminobenzidine as the reagent. The subsequent procedure is as in Example 1, except that the content of selenite ions is determined in the filtrate.

EXAMPLE 5

This Example is similar to Example 1, except that the anion-exchanger is first converted into the hydroxyl form and then treated with a 3% solution of $MgSO_4$. The material contains PSC $Mg(OH)_2$ in the amount of 43 percent by weight. To determine the PSC content in the material, the precipitate is dissolved and the content of magnesium ions is determined. The subsequent procedure is the same as in Example 1, except that the content of magnesium ions is determined in the filtrate.

EXAMPLE 6

Cation-exchanger S-150 (PUROLITE) is treated with a solution of $ZnSO_4$ till 80–100% conversion thereof into zinc form. Then the cation-exchanger is treated with a 5% solution of $Na_2CO_3$ under dynamic conditions with the consumption of 3 volumes of the solution per volume of the cation-exchanger. After that the cation-exchanger is washed with distilled water. The operations are repeated 2 times. The material contains PSC $ZnCO_3$ in the amount of 61 percent by weight. For determining the PSC content in the material, the precipitate is dissolved, and the content of zinc ions in the solution is determined. The subsequent procedure is the same as in Example 1, except that 5 $cm^3$ of the material are placed into the column, and the content of zinc ions is determined in the filtrate.

EXAMPLE 7

Anion-exchanger AN-511 is treated with a solution of NaOH till complete conversion thereof into hydroxyl form. Then the cation-exchanger is treated with a 5% solution of $KMnO_4$ under static conditions with the s/l ratio=1:2. After contacting for 0.5 hour the solution is decanted, and the material is washed with distilled water. The material contains PSC $Mn(OH)_2$ and $MnO_2$ in the amount of 25 percent by weight on conversion to manganese. For determining the PSC content in the material, the material is incinerated, and the content of manganese is determined in the residue.

EXAMPLE 8

This Example is similar to Example 1, except that cation-exchanger KU-23 is used as the PSC carrier, said cation-exchanger is converted into calcium form and treated with a 1% solution of $Na_2SO_4$ with the s/l ratio=1:20. The total number of treatments is 1. The material contains PSC $CaSO_4$ in the amount of 10 percent by weight.

EXAMPLE 9

Cation-exchanger KU-23 is treated with a solution of $CaCl_2$ till 80–100% conversion thereof into calcium form. Then the cation-exchanger is treated with a 30% solution of $MgSO_4$ under static conditions with the s/h ratio=1:1. After contacting for 2 hours, the solution is decanted, the cation-exchanger is treated with a 5% solution of $Na_2CO_3$ under static conditions with the s/l ratio=1:3. After contacting for one hour, the solution is decanted, the cation-exchanger is washed with distilled water. The content of PSC $CaSO_4$ and $MgCO_3$ in the material is 45 percent by weight. The PSC content in the material is determined from the difference in the concentrations of calcium and magnesium ions in the starting and equilibrium solutions. The subsequent procedure is similar to that used in Example 1, Except that demineralized water with TH of 0.05 mg-equiv./l is passed through the column and the content of calcium and magnesium ions is determined in the filtrate.

EXAMPLE 10

This Example is similar to Example 1, except that cation-exchanger KU-23 is used as the PSC carrier, said cation-exchanger is converted into calcium form and treated with a 5% solution of $Na_2SO_4$ with the s/l ratio=1:2. The total number of treatments is 6. The material contains PSC $CaSO_4$ in the amount of 72 percent by weight.

The use of material containing organic ion-exchangers in an amount of 35–90 percent by weight, having a porous structure in the air-dry state provides uniform release of physiologically essential ions into water with the specific rate of water passage through the material higher than 0.5 $min^{-1}$.

If the content of poorly soluble inorganic compounds on the anion-exchanger is smaller than 10 percent by weight, sufficient amount of physiologically essential ions does not enter into the water. If the PSC content on he ion-exchanger is greater than 65 percent by weight, the number of required treatments increases sharply, the process for the preparation of the material being thereby complicated and the stability of the material operation lowered.

As is seen from the presented Examples and Tables, the use of the material wherein organic ion-exchangers with a definite structure and in a definite ratio thereof with poorly soluble inorganic compounds are used as the carrier, makes it possible to introduce into water not only macro- but also microelements, to increase the rate of water filtration, which was almost impossible to achieve with the use of the known technical solution. With the use of such material, the specific output (the rate of water passage) can be increased sixfold.

The number and type of the employed organic ion-exchangers and poorly soluble compounds are not confined to the presented Examples.

TABLE 2

Content of ions and physiological norms of the content of ions in water

| Nos. | Ion | Content of ions in water, mg/l, mg-equiv./l after passage of water, lit. | | | | | | PN, mg/l, mg-equiv./l |
|---|---|---|---|---|---|---|---|---|
| | | 1 | 10 | 10* | 20 | 20* | 30 | |
| 1. | $Ca^{2+}$ | 3.2 | 2.4 | 2.2 | 1.8 | 2.0 | 1.8 | 0.5–5.0 |
| 2. | $F^-$ | 1.3 | 1.0 | 1.1 | 0.9 | 0.9 | 0.8 | 0.5–1.5 |
| 3. | $Cu^{2+}$ | 0.26 | 0.24 | 0.24 | 0.22 | 0.23 | 0.2 | 0.05–0.3 |
| 4. | $SeO_3^{2+}$ | 0.01 | 0.008 | 0.006 | 0.006 | 0.004 | 0.006 | >0.01 |
| 5. | $Mg^{2+}$ | 1.2 | 1.0 | 0.9 | 0.9 | 0.9 | 0.7 | 0.3–2.0 |
| 6. | $Zn^{2-}$ | 1.1 | 1.1 | 1.1 | 0.9 | 0.8 | 0.8 | 0.3–1.0 |
| 7. | $Mn^{2-}$ | 0.08 | 0.05 | 0.05 | 0.04 | 0.04 | 0.03 | 0.01–0.1 |
| 8. | $Ca^{2+}$ | 0.9 | 0.7 | 1.3 | 0.5 | 1.0 | 0.4 | 0.5–5.0 |
| 9. | $Ca^{2+}$ | 2.8 | 2.1 | 2.3 | 1.4 | 1.6 | 1.1 | 0.5–5.0 |
| | $Mg^{2+}$ | 0.8 | 0.7 | 0.7 | 0.5 | 0.5 | 0.4 | 0.3–2.0 |
| 10. | $Ca^{2+}$ | 4.6 | 3.8 | 4.5 | 3.4 | 3.7 | 3.1 | 0.5–5.0 |

*After a break of 24 h.

What is claimed is:

1. A material for introducing inorganic elements into water, the material comprising a carrier and a plurality of inorganic compounds that are sparingly soluble in water, wherein the carrier is an organic ion-exchanger having a porous structure in an air-dry state, said organic ion-exchanger reacting with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight, wherein the carrier is capable of sorption of heavy metal ions.

2. A material for introducing inorganic elements into water, the material comprising a carrier and a plurality of inorganic compounds that are sparingly soluble in water, wherein the carrier is an organic ion-exchanger having a porous structure in an air-dry state, said organic ion-exchanger reacting with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight, wherein the carrier sorbs the sparingly soluble compounds comprising $Ca^{+2}$, $F^-$, $Cu^{+2}$, $Mg^{+2}$, $Zn^{+2}$, and $Mn^{+2}$ ions.

3. The material according to claim 2, wherein the carrier also sorbs the sparingly soluble compounds comprising $SeO_3^{+2}$ ions.

TABLE 1

Parameters of the material and of the process for the production thereof

| Nos. | Ion-exchanger | PSC | Concentration Of precipitant solution | s/l ratio | Number of treatments | Ion-exchanger-to-PSC ratio |
|---|---|---|---|---|---|---|
| 1. | AV-17-10P | $CaSO_4$ | 5% | 1:2 | 3 | 35:65 |
| 2. | KU-23 | $CaF_2$ | 3% | 1:3 | 1 | 84:16 |
| 3. | S-106 | $Cu(OH)_2$ | 10% | 3** | — | 42:58 |
| 4. | A-835 | $Ag_2SeO_2$ | 2% | 1:10 | 1 | 99:10 |
| 5. | AV-17-10P | $Mg(OH)_3$ | 3% | 1:2 | 3 | 57:43 |
| 6. | S-150 | $ZnCO_3$ | 5% | 3** | — | 39:61 |
| 7. | AN-511 | $Mn(OH)_2$ | 5% | 1:2 | 1 | 75:25 |
| 8. | KU-23 | $CaSO_4$ | 1% | 1:20 | 1 | 90:10 |
| 9. | KU-23 | $CaSO_4$ | 30% | 1:3 | 1 | |
| | | $Mg(OH)_3$ | 5% | | | |
| 10. | KU-23 | $CaSO_4$ | 5% | 1:2 | 6 | 38:72 |

**The volume of passed precipitant solution, lit.

4. A material for introducing inorganic elements into water, the material comprising a carrier and a plurality of inorganic compounds that are sparingly soluble in water, wherein the carrier is an organic ion-exchanger having a porous structure in an air-dry state, said organic ion-exchanger reacting with the sparingly soluble compounds such that the sparingly soluble inorganic compounds are contained in pores of the organic ion-exchanger, wherein the ratio of the ion-exchanger to the sparingly soluble inorganic compounds is between 84:16 to 35:65.

5. The material according to claim 4, wherein each of the sparingly soluble inorganic compounds has a solubility in water that is lower than 8 g/l.

6. A material for introducing inorganic elements into water, the material comprising a carrier and a plurality of inorganic compounds that are sparingly soluble in water, wherein the carrier is an organic ion-exchanger having a porous structure in an air-dry state, said organic ion-exchanger reacting with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight, wherein each of the sparingly soluble inorganic compounds has a solubility in water that is lower than 8 g/l.

7. The material according to claim 6, wherein the sparingly soluable inorganic compounds include at least one compound selected from the group consisting of zinc, copper, iron and chromium.

8. A material for introducing inorganic elements into water, the material comprising a carrier and a plurality of inorganic compounds that are sparingly soluble in water, wherein the carrier is an organic ion-exchanger having a porous structure in an airry state, said organic ion-exchanger reacting with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight, wherein the carrier is a cation-exchanger with a matrix selected from the group consisting of a polystyrene, polyacrylic and polymethacrylic matrix.

9. A material for introducing inorganic elements into water, the material comprising a carrier and a plurality of inorganic compounds that are sparingly soluble in water, wherein the carrier is an organic ion-exchanger having a porous structure in an air-dry state, said organic ion-exchanger reacting with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight, wherein the carrier is an anion-exchanger with a polystyrene or polyacrylic matrix.

10. A material for introducing inorganic elements into water, the material comprising a carrier and a plurality of inorganic compounds that are sparingly soluble in water, wherein the carrier is an organic ion-exchanger having a porous structure in an air-dry state, said organic ion-exchanger reacting with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight, wherein a total volume of the pores is from 0.1 cm$^3$/g to 1.0 cm$^3$/g.

11. The material according to claim 10, wherein the carrier comprises granules of between 0.3 mm and 1.5 mm in size.

12. A material for introducing inorganic elements into water, the material comprising a carrier and a plurality of inorganic compounds that are sparingly soluble in water, wherein the carrier is an organic ion-exchanger having a porous structure in an air-dry state, said organic ion-exchanger reacting with the sparingly soluble compounds such that the sparingly soluble inorganic compounds are contained in pores of the organic ion-exchanger with a ratio of the ion-exchanger to the sparingly soluble inorganic compounds being 35–90:10–65 percent by weight, wherein the sparingly soluble inorganic compounds include at least the following elements: Ca, Mg, F, Se, Zn, Cu, Fe, Mn and Cr.

* * * * *